(12) United States Patent
Janssen

(10) Patent No.: US 8,540,430 B2
(45) Date of Patent: Sep. 24, 2013

(54) METHOD FOR THE PRODUCTION OF A GUIDE RAIL AND GUIDE RAIL

(75) Inventor: Toon Janssen, Venray (NL)

(73) Assignee: Inalfa Roof Systems Group B.V., Venray (NL)

(*) Notice: Subject to any disclaimer, the term of this patent is extended or adjusted under 35 U.S.C. 154(b) by 311 days.

(21) Appl. No.: 12/745,616

(22) PCT Filed: Dec. 4, 2007

(86) PCT No.: PCT/EP2007/063228
§ 371 (c)(1),
(2), (4) Date: Nov. 1, 2010

(87) PCT Pub. No.: WO2009/071116
PCT Pub. Date: Jun. 11, 2009

(65) Prior Publication Data
US 2011/0033139 A1 Feb. 10, 2011

(51) Int. Cl.
*F16C 29/02* (2006.01)
(52) U.S. Cl.
USPC ............................... 384/42; 384/26
(58) Field of Classification Search
USPC ........................................ 384/26, 42
See application file for complete search history.

(56) References Cited

U.S. PATENT DOCUMENTS 5,383,811 A * 1/1995 Campbell et al. ............... 384/42
6,425,778 B1 7/2002 Haq et al.

FOREIGN PATENT DOCUMENTS

| DE | 202005007073 | 10/2006 |
| FR | 2836808 | 9/2003 |
| GB | 2122270 | 1/1984 |

OTHER PUBLICATIONS

Official Search Report of the European Patent Office in counterpart foreign application No. PCT/EP2007/063228 filed Dec. 4, 2007.
Written Opinion of the European Patent Office in counterpart foreign application No. PCT/ EP2007/063228 filed Dec. 4, 2007.

* cited by examiner

*Primary Examiner* — Thomas R Hannon
(74) *Attorney, Agent, or Firm* — Steven M. Koehler; Westman, Champlin & Koehler, P.A.

(57) ABSTRACT

The invention provides a method for the production of a guide rail of the type comprising at least two spaced apart guide faces which at corresponding sides are connected through a connecting web. A first step comprises manufacturing the guide rail in a configuration in which the guide faces, compared to their intended final position, are spaced apart further through an imaginary rotation around a part of the connecting web; a next step comprises moving the guide faces towards the intended final position. Further a guide rail is provided.

20 Claims, 1 Drawing Sheet

METHOD FOR THE PRODUCTION OF A GUIDE RAIL AND GUIDE RAIL

CROSS-REFERENCE TO RELATED APPLICATION

Figure 1:
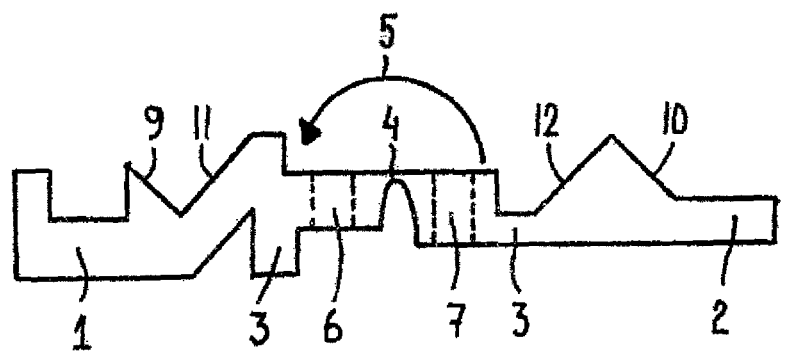

The present application is a national stage filing of International patent application Ser. No. PCT/EP2007/063228, filed Dec. 4, 2007, and published as WO 2009/07116 in English.

BACKGROUND

The discussion below is merely provided for general background information and is not intended to be used as an aid in determining the scope of the claimed subject matter.

An aspect of the invention firstly relates to a method for the production of a guide rail of the type comprising at least two spaced apart guide faces which at corresponding sides are connected through a connecting web.

A state of the art guide rail of the above type is manufactured from aluminum using an extrusion process. It is a disadvantage however that a guide rail manufactured from aluminum in many applications (amongst which the application in open roof constructions for vehicles) then cannot obtain its optimal shape for use.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention is a method comprising:
manufacturing the guide rail in a configuration in which the guide faces, compared to their intended final position, are spaced apart further through an imaginary rotation around a part of a connecting web; and
moving the guide faces towards the intended final position.

In one embodiment, the guide rail is manufactured from plastic material with a living hinge in the connecting web in a configuration in which the guide faces, compared to their intended final position, are spaced apart further through an imaginary folding of the connecting web around said living hinge; and wherein the connecting web is folded around the living hinge for moving the guide faces towards the intended final position.

As a result the guide rail can be manufactured initially in a 'folded open' position (for example a position in which all parts of the guide rail, i.e. both guide faces and the web, are substantially positioned in a single plane) such that manufacturing the guide rail with all its parts (which often are of a complicated shape) is made easier. Thereafter the guide rail is folded or collapsed towards its final position and then is ready for use.

The method according to an aspect of the invention also provides the advantage that the introduction of a slide member, such as a slide shoe, in the guide rail is facilitated because the introduction of such a slide member can occur before the guide faces have reached their final position.

In one embodiment, the method according to an aspect of the invention further comprises stabilizing the guide faces in the final position after folding. Such a stabilizing prevents the guide rail from again assuming its initial ('folded open') position.

For example stabilizing the guide faces in the final position after folding may comprise the provision of cooperating fastening means or devices in the web at opposite sides of the living hinge.

In one embodiment the fastening means or devices comprise holes which will be aligned in the final position of the guide faces and which are meant for housing a fastening member, such as for example a screw. Using the screw (or screws) the guide rail can be maintained in its intended final position of use. But such a screw (or other fastening means) at the same time may be used for attaching the guide rail to an external constructive part (for example the roof of a vehicle).

As an example of an alternative solution, the fastening means or devices may comprise snap members which will cooperate in the final position of the guide faces.

The method also allows the provision of integral connecting means or devices which are connectable to external parts. Such external parts, for example, may comprise members attached to the guide rail for providing specific functions (e.g. guide function for a drive cable).

In one embodiment manufacturing the guide rail occurs through injection-moulding. Because of the 'folded open' state of the guide rail during the initial stage of its production, the injection-moulding process can be used to produce a guide rail even with complicated shapes.

Finally an embodiment of the method is possible comprising providing the parts of the web at opposite sides of the living hinge engaging each other in the final position of the guide faces with mating profiles. Such mating profiles can help in obtaining a stable guide rail.

The method further has the advantage that a number of steps which are needed if the guide rail is made of aluminum, are not needed anymore, such as anoding and milling. The resultant guide rail generally is stiffer and produces less disturbing noises.

In an alternative embodiment the guide faces initially are manufactured as separate parts which thereafter are connected. Details as to the connection between these parts can be extracted from the relevant embodiments with respect to the method using a living hinge.

Another aspect of the invention secondly relates to a guide rail of the type comprising at least two spaced apart guide faces which at corresponding sides are connected through a connecting web. Such a guide rail can be manufactured from plastic material, wherein the connecting web is provided with a living hinge extending in the longitudinal direction of the guide rail.

In one embodiment, then, the connecting web comprises cooperating fastening means or devices at opposite sides of the living hinge. For example such fastening means or devices could comprise holes for housing a fastening member, such as for example a screw (or screws).

In another embodiment, however, the fastening means comprise cooperating snap members.

It is possible too that the guide rail further comprises integral connecting means or devices which are connectable to external parts, for example parts for creating a guide channel for a drive cable.

Finally, in a special embodiment the parts of the web at opposite sides of the living hinge have mating profiles engaging each other in the final position of the guide faces. As stated before, this may increase the stability of the guide rail (in the final position of the guide faces).

BRIEF DESCRIPTION OF THE ILLUSTRATIVE DRAWING

Figure 2:
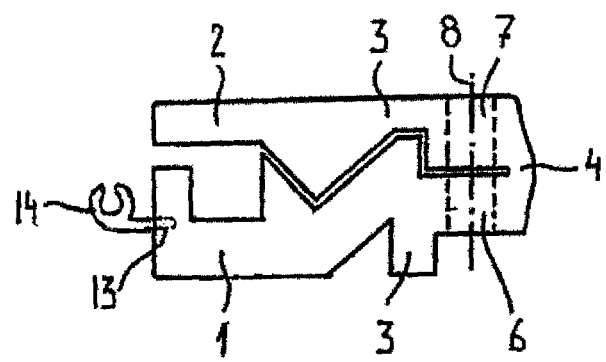

Hereinafter the invention will be elucidated while referring to the drawing, in which FIG. 1 illustrates a cross-sectional view of a guide rail according to the invention in an initial shape, and FIG. 2 illustrates the guide rail of FIG. 1 in its final shape.

DETAILED DESCRIPTION OF THE ILLUSTRATIVE EMBODIMENTS

Firstly referring to FIG. 2, a guide rail comprises a first guide face 1 and a spaced apart second guide face 2. The guide faces 1 and 2 are connected through a connecting web 3.

Such a guide rail can be used to guide a guide member (not shown) between the guide faces 1 and 2 for a sliding or rolling movement in the longitudinal direction of the guide rail.

The guide rail illustrated in FIG. 2 can be produced in the following manner (see FIG. 1): manufacturing the guide rail from plastic material with a living hinge 4 in the connecting web 3, in a configuration in which the guide faces 1 and 2, compared to their intended final position (as shown in FIG. 2), are spaced apart further through an imaginary folding of the connecting web 3 around said living hinge 4 (in the specific embodiment shown here this configuration is a configuration in which the guide faces 1 and 2 and the web are substantially aligned; it is possible, however, that these parts are not aligned but enclose an angle); and folding the connecting web 3 around the living hinge 4 (according to arrow 5 in FIG. 1) for moving the guide faces 1 and 2 towards the intended final position (shown in FIG. 2).

Manufacturing the guide rail can occur through injection-moulding (using a mould not illustrated).

After folding mentioned above the guide faces are stabilized in the final position. In the illustrated embodiment holes 6 and 7 are provided in the connecting web 3 at opposite sides of the living hinge which will be aligned in the final position of the guide faces (FIG. 2) and which are meant for housing a fastening member, such as a screw 8 (illustrated schematically in FIG. 2). There may be provided a number of pairs of holes in the longitudinal direction of the guide rail.

Such holes 6 and 7 may be provided during the initial manufacturing of the guide rail (e.g. during injection-moulding), but also may be prepared later, e.g. by drilling.

Parts of the web 3 at opposite sides of the living hinge 4 engaging each other in the final position of the guide faces are provided with mating profiles (e.g. 9 and 10; 11 and 12) for obtaining a stable and firm position of the guide rail in its final position according to FIG. 2.

The guide rail further may comprise integral connecting means or devices which are connectable to external parts (such as a for example a hole 13 for receiving a cable guide 14).

The invention is not limited to the embodiments described before, which may be varied widely within the scope of the invention as described by the appending claims.

The invention claimed is:

1. A guide rail comprising at least two spaced apart guide faces which at corresponding sides are connected through a connecting web provided with a living hinge extending in the longitudinal direction of the guide rail to provide a folding axis, the connecting web comprising cooperating fastening elements at opposite sides of the living hinge, wherein the guide faces are movable to a final position that defines a guiding channel in the longitudinal direction of the guide rail, and wherein the cooperating fastening elements, in the final position, are aligned with each other and spaced away from the guiding channel in a lateral direction such that the cooperating fastening elements are disposed between the folding axis and the guiding channel.

2. The guide rail according to claim 1, wherein the guide rail is manufactured from plastic material.

3. The guide rail according to claim 1, wherein the fastening elements comprise holes configured for receiving a fastening member.

4. The guide rail according to claim 1, wherein the fastening elements comprise cooperating snap members.

5. The guide rail according to claim 1, wherein the guide rail includes integral connecting elements which are configured to be connected to external parts.

6. The guide rail according to claim 1, wherein, in the final position, the guide faces form openings to the guiding channel at opposite ends of the guide rail.

7. A guide rail comprising at least two spaced apart guide faces which at corresponding sides are connected through a connecting web, wherein the connecting web is provided with a living hinge extending in the longitudinal direction of the guide rail, wherein parts of the web at opposite sides of the living hinge are configured with mating profiles so as to engage each other in the final position of the guide faces.

8. The guide rail according to claim 7, wherein the connecting web comprises cooperating fastening elements at opposite sides of the living hinge, wherein the fastening elements comprise holes configured for receiving a fastening member.

9. The guide rail according to claim 7, wherein the connecting web comprises cooperating fastening elements at opposite sides of the living hinge, wherein the fastening elements comprise cooperating snap members.

10. The guide rail according to claim 7, wherein the guide rail includes integral connecting elements which are configured to be connected to external parts.

11. A method for the production of a guide rail comprising at least two spaced apart guide faces which at corresponding sides are connected through a connecting web, the method comprising:
   manufacturing the guide rail in a configuration in which the guide faces, compared to final position, are spaced apart further, the guide faces being rotatable around a living hinge of the connecting web extending in a longitudinal direction of the guide rail to provide a folding axis, the connecting web comprising cooperating fastening elements at opposite sides of the living hinge; and
   moving the guide faces towards the final position in which the guide faces define a guiding channel extending in the longitudinal direction of the guide rail, wherein in the final position the cooperating fastening elements are aligned with each other and spaced away from the guiding channel in a lateral direction such that the cooperating fastening elements are disposed between the folding axis and the guiding channel.

12. The method according to claim 11, wherein manufacturing includes manufacturing the guide rail from plastic material with a living hinge in the connecting web in a configuration in which the guide faces, compared to the final position, are spaced apart further through an imaginary folding of the connecting web around said living hinge; and wherein moving the guide faces towards the final position includes folding the guide faces around the living hinge.

13. The method according to claim 12, and further comprising stabilizing the guide faces in the final position after folding.

14. The method according to claim 13, wherein stabilizing the guide faces in the final position after folding comprises fastening opposite sides of the living hinge using the fastening elements.

15. The method according to claim 14, wherein fastening comprises aligning holes which will be aligned in the final position of the guide faces, wherein the holes are configured for receiving a fastening member.

16. The method according to claim 14, wherein the fastening member comprises snap members which will cooperate in the final position of the guide faces.

17. The method according to claim 12, and further comprising providing parts of the web at opposite sides of the living hinge with mating profiles so as to engage each other in the final position of the guide faces.

18. The method according to claim 11, wherein manufacturing includes providing integral connecting elements in the guide rail.

19. The method according to claim 11, wherein manufacturing the guide rail occurs through injection-molding.

20. The method according to claim 11, wherein the guide faces and connecting web are manufactured as an integral body.

\* \* \* \* \*

UNITED STATES PATENT AND TRADEMARK OFFICE
CERTIFICATE OF CORRECTION

PATENT NO. : 8,540,430 B2  Page 1 of 1
APPLICATION NO. : 12/745616
DATED : September 24, 2013
INVENTOR(S) : Toon Janssen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this
Fifteenth Day of September, 2015

Michelle K. Lee
*Director of the United States Patent and Trademark Office*